US010533683B2

United States Patent
Espinasse et al.

(10) Patent No.: US 10,533,683 B2
(45) Date of Patent: Jan. 14, 2020

(54) REMOVABLE COVER INTENDED FOR BEING ARRANGED OPPOSITE A FLUID-TRANSPORT PIPE SUBMERGED IN A BODY OF WATER, ASSOCIATED INTERVENTION ASSEMBLY AND METHOD

(71) Applicant: TECHNIP FRANCE, Courbevoie (FR)

(72) Inventors: Philippe Espinasse, Bihorel (FR); Thomas Parenteau, Paris (FR); Sylvain Routeau, Saint Cloud (FR); Antoine Marret, Paris (FR)

(73) Assignee: TECHNIP FRANCE (FR)

( * ) Notice: Subject to any disclaimer, the term of this patent is extended or adjusted under 35 U.S.C. 154(b) by 16 days.

(21) Appl. No.: 15/577,108

(22) PCT Filed: Feb. 1, 2016

(86) PCT No.: PCT/EP2016/052057
§ 371 (c)(1),
(2) Date: Nov. 27, 2017

(87) PCT Pub. No.: WO2016/188640
PCT Pub. Date: Dec. 1, 2016

(65) Prior Publication Data
US 2018/0202579 A1 Jul. 19, 2018

(30) Foreign Application Priority Data
May 27, 2015 (FR) ...................................... 15 54771

(51) Int. Cl.
*F16L 1/12* (2006.01)
*F16L 53/35* (2018.01)
(52) U.S. Cl.
CPC ............... *F16L 1/123* (2013.01); *F16L 53/35* (2018.01)

(58) Field of Classification Search
CPC .......... F16L 1/123; F16L 53/35; B08B 9/027; B08B 17/04
(Continued)

(56) References Cited

U.S. PATENT DOCUMENTS 4,423,311 A * 12/1983 Varney, Sr. ............... E03B 7/14
392/468
4,433,556 A * 2/1984 Brady ...................... F25D 3/10
138/89

(Continued)

FOREIGN PATENT DOCUMENTS

EP 0 838 127 B1 4/1998
FR 2 788 831 A1 7/2000
(Continued)

OTHER PUBLICATIONS

International Search Report dated Apr. 13, 2016 in corresponding PCT International Application No. PCT/EP2016/052057.
(Continued)

*Primary Examiner* — Craig M Schneider
*Assistant Examiner* — David R Deal
(74) *Attorney, Agent, or Firm* — Ostrolenk Faber LLP (57) ABSTRACT

A cover including an elongate body, capable of being applied to be facing an outer surface of the pipe, and at least one longitudinal interaction element for interacting with the pipe, supported by the elongate body. The elongate body is reversibly deformable under the effect of its own weight, the elongate body having a length of more than 10 m. The cover treats solid build-ups within a fluid-transport pipe in a simple, straightforward and inexpensive manner.

26 Claims, 7 Drawing Sheets

(58) Field of Classification Search
USPC .................................................. 138/33, 35
See application file for complete search history.

(56) References Cited

U.S. PATENT DOCUMENTS

| | | | | |
|---|---|---|---|---|
| 5,390,961 | A * | 2/1995 | Guthrie | F16L 59/14 285/41 |
| 6,315,497 | B1 * | 11/2001 | Wittman | E21B 17/015 405/158 |
| 6,617,556 | B1 * | 9/2003 | Wedel | E21B 43/01 219/629 |
| 6,913,079 | B2 | 7/2005 | Tubel | 166/250.01 |
| 6,939,082 | B1 | 9/2005 | Baugh | 405/154 |
| 6,946,627 | B2 * | 9/2005 | Thomassen | F16L 53/37 219/535 |
| 6,955,221 | B2 * | 10/2005 | Bursaux | E21B 36/005 166/303 |
| 7,036,596 | B2 | 5/2006 | Reid | 166/302 |
| 7,069,957 | B2 * | 7/2006 | Hallot | F16L 59/143 138/108 |
| 7,234,523 | B2 | 6/2007 | Reid | 166/302 |
| 7,282,638 | B2 * | 10/2007 | Karlsen | F16L 53/37 174/15.1 |
| 7,485,801 | B1 | 2/2009 | Pulter et al. | 174/15.2 |
| 9,303,795 | B2 * | 4/2016 | Critsinelis | F16L 9/19 |
| 9,677,714 | B2 * | 6/2017 | Wray | F16L 55/1003 |
| 9,945,508 | B2 * | 4/2018 | Espinasse | F16L 59/141 |
| 2009/0107558 | A1 * | 4/2009 | Quigley | F16L 11/12 137/15.01 |
| 2010/0051279 | A1 | 3/2010 | Baugh et al. | 166/302 |

FOREIGN PATENT DOCUMENTS

| | | | |
|---|---|---|---|
| FR | 2 799 261 B1 | 4/2001 | |
| WO | WO-9001584 A1 * | 2/1990 | ............... E02B 3/12 |
| WO | WO 2004/013597 A2 | 2/2004 | |
| WO | WO 2004/111519 A1 | 12/2004 | |
| WO | WO 2010/135772 A1 | 12/2010 | |

OTHER PUBLICATIONS

Written Opinion dated Apr. 13, 2016 in corresponding PCT International Application No. PCT/EP2016/052057.
Search Report dated Apr. 1, 2016 in corresponding French Patent Application No. 15 54771.
A. Félix-Henry, "Prevention and Monitoring of Fatigue-Corrosion of Flexible Risers' Steel Reinforcements," Proceedings of the 26th International Conference on Offshore Mechanics and Arctic Engineering, OMAE2007, Jun. 10-15, 2007, San Diego, California, USA, OMAE2007-29186, 7 pages.
A. Felix-Henry et al., "Flexible Pipes In-Service Monitoring," Proceedings of OMAE 2004, 23rd International Conference on Offshore Mechanics and Arctic Engineering, Jun. 20-25, 2004, Vancouver, Canada, OMAE2004-51348, 6 pages.
S. Denniel et al., "Active Heating for Ultra-Deepwater PiP and Risers," Offshore Technology Conference, OTC 13138, 10 pages, 2001.
N. Laouir et al., "Heated PiP: Combining Passive Insulation and Active Heating for Enhanced Thermal Performance," 20th International Conference on Offshore Mechanics and Arctic Engineering—OMAE 2001, Rio de Janeiro, RJ, Brazil, Jun. 3-8, 2001, OMAE01-4014, 8 pages.
V. Cocault-Duverger et al., "Electrically Heated Pipe-in-Pipe—The system, the qualification and design tools for field architects," Deep Offshore Technology Conference, 2005, 11 pages.
OCEANEERING—Papasideris—Pipeline Heated Skid, 2014, 5 pages.
"Winterization for Cold Climate Operations," Offshore Standard, DNV-OS-A201, 83 pages, Oct. 2013.
F. Chakkalakal et al., "Electric Gut Tracing—An Innovative Approach to Pipeline Heating," IEEE 2008, 10 pages.
"Subsea Hydrate Dissociation Tool SAES," ATIVA Tecnologia & Desenvolvimento LTDA.
THERMON—Heat Insulation Jackets, Product Application Information, Thermon Manufacturing Co., 1 page.

* cited by examiner

REMOVABLE COVER INTENDED FOR BEING ARRANGED OPPOSITE A FLUID-TRANSPORT PIPE SUBMERGED IN A BODY OF WATER, ASSOCIATED INTERVENTION ASSEMBLY AND METHOD

CROSS-REFERENCE TO RELATED APPLICATIONS

The present application is a 35 U.S.C. §§ 371 national phase conversion of PCT/EP2016/052057, filed Feb. 1, 2016, which claims priority to French Patent Application No. 15 54771, filed May 27, 2015, the contents of which are incorporated herein by reference. The PCT International Application was published in the French language.

TECHNICAL FIELD

The present invention relates to a removable cover that is intended to be arranged to be facing a fluid transport pipe submerged in a body of water, which comprises:
- an elongate body, that is capable of being applied to be facing an outer surface of the pipe;
- at least one longitudinal interaction element for interacting with the pipe, supported by the elongate body.

BACKGROUND AND SUMMARY OF THE INVENTION

The fluid transport pipe is for example disposed at the bottom of a body of water, for transporting fluid over the bed of the body of water, before the raising thereof to the surface.

The pipe is advantageously a rigid pipe formed from at least one metal tube. By way of a variant, the pipe is a flexible pipe. It is for example laid on the bottom of the body of water or/and is buried in the bed of the body of water at a shallow depth.

The fluid transported by the pipe is in particular a petroleum fluid containing hydrocarbons, such as petroleum or natural gas.

When this type of fluid is in circulation at the bottom of a body of water at great depths, the compounds present in the fluid, such as hydrates or paraffins are very prone to solidifying and forming build-ups of solids including for example constrictions and in certain critical cases plugs.

By way of a variant, the hydrates and paraffins are formed during a shut-down of production due to a maintenance operation or a malfunction.

The build-ups of solid thus formed disrupt the flow and circulation of the fluid and the operation of the installation, which could lead to significant losses in revenues for the operator of the facility.

The method generally used in the industry in order to unclog a pipe blocked by hydrates is depressurisation. Indeed, pressure being one of the conditions for formation of the hydrates, the depressurisation of the pipe over a fairly long time period helps bring about, at least partially, the elimination of plugs. The greater the degree of depressurisation the lesser the time necessary to bring about the dissociation of plugs. However, overly excessive and extremely rapid depressurisation of the interior of the pipe may cause the collapse of the pipe on to itself under the effect of external pressure, in particular but not exclusively in the case of flexible pipes.

Similarly, the column of liquid within the interior of the rising column ("riser" as per the accepted terminology) imposes a hydrostatic pressure within the interior of the pipe that is difficult to control. Thus it is impossible to depressurise below a certain threshold level imposed by this hydrostatic pressure. In practice, depending on the level of depressurisation within the interior of the pipe and the depth at which the said pipe is located, the time required for the dissociation may easily amount to several months.

In addition, this method entails collecting of the gas or liquid at the surface during the dissociation of the plugs. As a consequence thereof, in order to be performed this operation necessitates the intervention by a specialised vessel that is capable of collecting and processing these fluids in accordance with the standards stipulated in the ATEX directives, which is rare and very expensive.

In certain cases, it is also known practice to introduce into the pipe a mechanical system designed to dislodge the plugs. Operations of this type are burdensome and difficult to carry out and costly. They generally require a shut-down of the production processes. In addition, these operations can be performed only over a relatively short length and typically over the vertical part of the pipe.

Also, in critical cases, none of the conventional means prove to be effective in unblocking the pipe, thus resulting in it's becoming inoperative.

An alternative treatment device for treating plugs in a fluid transport pipe is described for example in the document U.S. Pat. No. 6,939,082. In this device, a remotely operated vehicle is lowered down to a point of the pipe at which a hydrate plug is found. A liner is disposed above the pipe, while leaving available an intermediate space. The water present in the intermediate space is heated and made to circulate in order to heat the pipe and cause the melting of the plug.

Such a device is not entirely satisfying. The operational implementation thereof is burdensome and difficult and makes it necessary to form a local seal in the intermediate space defined above the pipe. The temperature applied to the pipe is difficult to control in a precise manner. Furthermore, the location of the hydrate plug must be known a priori, prior to treating it, which requires lengthy and costly investigations.

In addition, this device provides for only highly localized treatment of the plug (typically 2 m). In the absence of data relating to the location and the length of the plug, the time periods required to perform the operations could become excessively long.

The use of such a device also carries certain risks. In effect, the generation of plugs results in an irregularity in the pressure levels along the pipe line. Thus, the pressure may be much higher on one side than on the other side of the plug. The local heating increases the problems of irregularity that can bring about the violent expulsion of the plug and cause damage to the pipe, or even create zones of overpressure that could degrade the pipe.

In addition, once the zone has been treated, if the device were to be moved for treating a new zone, there is a risk of the hydrates being possibly reformed in the zone that was initially treated during the treatment of the subsequent zone.

One object of the invention is to provide a device that makes it possible to monitor and treat effectively, in a simple and inexpensive manner, the build-ups of solid material within a fluid transport pipe submerged in a body of water.

To this end, the object of the invention relates to a cover of the aforementioned type, characterized in that the elongate body is reversibly deformable under the effect of its own weight, the elongate body having a length of more than 10 m.

The cover according to the invention may include one or more of the following characteristic features, taken into consideration in isolation or in accordance with any technically possible combination:
- the elongate body has a length that is greater than 100 m, advantageously greater than 1 km;
- at least one longitudinal interaction element for interacting with the pipe is a longitudinal temperature measurement sensor for measuring the temperature, that is borne by the elongate body;
- the longitudinal temperature measuring sensor extends over at least 90% of the length of the elongate body;
- the cover includes at least one ballast element borne by the elongate body;
- the elongate body is adapted so as to be wound in a reversible manner over a rotating storage device;
- the cover includes at least one longitudinal reinforcement armor borne by the elongate body;
- the cover includes at least one handling element that is adapted so as to be gripped by a remotely operated underwater vehicle;
- the elongate body comprises a thermally insulating material;
- at least one longitudinal interaction element for interacting with the pipe is a longitudinal heating element advantageously comprising an electrical heating resistor.

The object of the invention also relates to an operating assembly disposed to be facing a fluid transporting pipe submerged under a body of water, that comprises:
- at least one cover as defined here above;
- an activation, control and monitoring unit for activating, controlling and monitoring the or each longitudinal interaction element for interacting with the pipe, connected to the or each cover.

The assembly according to the invention may include one or more of the following characteristic features, taken into consideration in isolation or in accordance with any technically possible combination:
- a rotating storage device, the cover being adapted so as to be wound and unwound in a reversible manner over the rotating storage device.

The invention also relates to an interaction method for interacting with a fluid transport pipe disposed in a body of water, that includes the following steps:
- provision of a cover as defined here above;
- placement of the cover in the body of water in order for it to be disposed to be facing an outer surface of the fluid transport pipe;
- activation of the or each longitudinal interaction element for interacting with the pipe, so as to interact with the pipe, in particular for heating the pipe or for measuring a temperature of the pipe.

The method according to the invention may include one or more of the following characteristic features, taken into consideration in isolation or in accordance with any technically possible combination:
- the step of placement of the cover includes the application of the cover on to the outer surface of the fluid transport pipe, and the spontaneous deformation of the cover so as to fittingly adapt to the form and shape of the outer surface of the fluid transport pipe.
- the pipe is at least partially buried in the bed of the body of water, the step of placement comprising the application of the cover on to a bearing surface situated so as to be at a distance away from and facing the outer surface of the fluid transport pipe, advantageously on the bed of the body of water, and the spontaneous deformation of the cover so as to fittingly adapt to the form and shape of the bearing surface.

BRIEF DESCRIPTION OF THE DRAWINGS

The invention will be better understood upon reading the description which will follow, provide solely by way of example, and with reference made to the accompanying drawings, in which.

DESCRIPTION OF PREFERRED EMBODIMENTS

Figure 1:
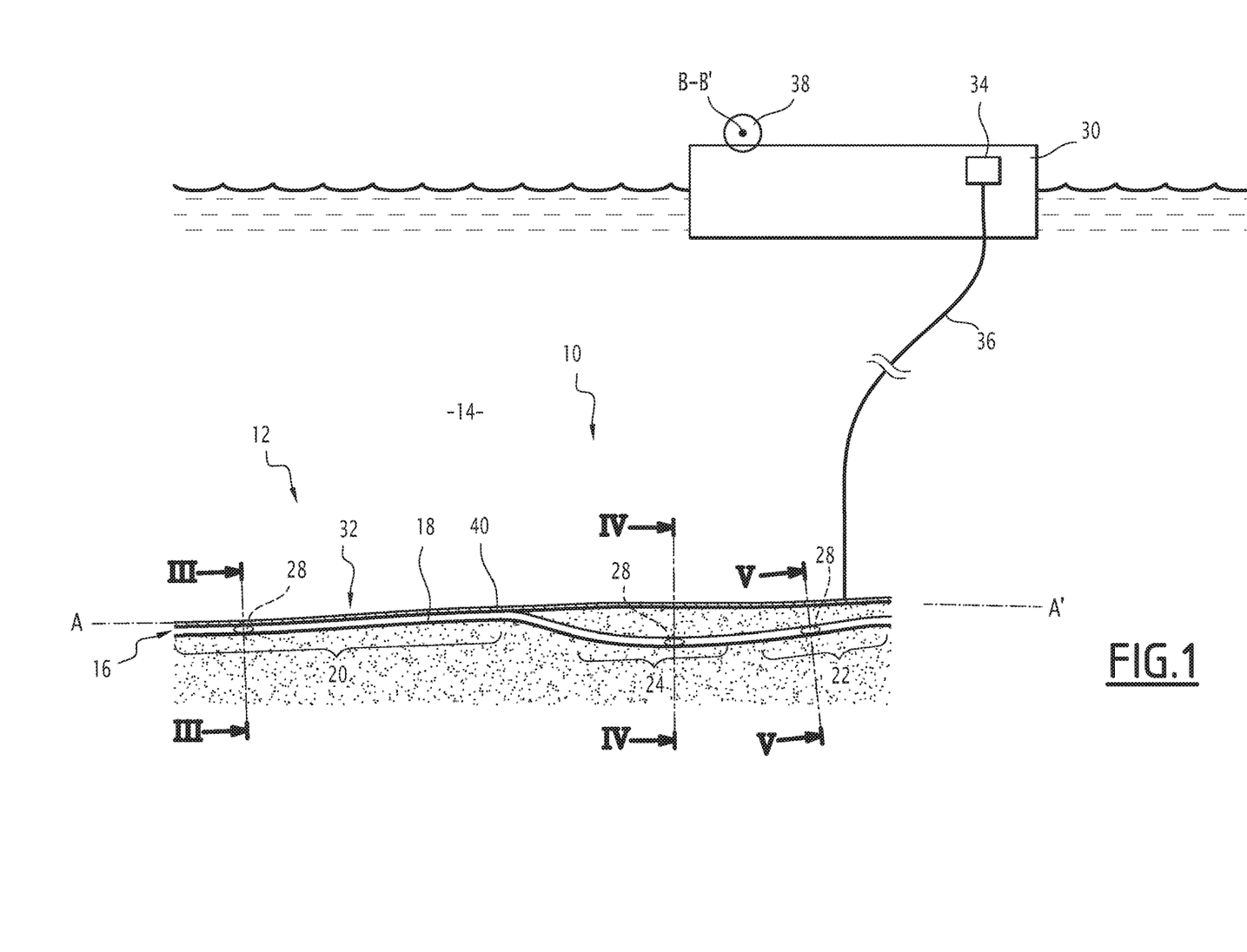
FIG. 1 is a schematic view, taken through a body of water, of an operational installation that is used to exploit fluids, wherein a heating assembly according to the invention has been operationally implemented.

A first operating assembly 10 according to the invention is illustrated schematically in FIG. 1. The assembly 10 is intended to be used in an operational installation 12 that is used to exploit fluids in a body of water 14.

The body of water 14 is for example a sea, a lake or an ocean. The depth of the body of water 14 directly aligned above the operational installation that is used to exploit fluids 12 is for example between 10 m and 3000 m, or even more.

The installation 12 includes at least one pipe 16 placed on the bed 18 of the body of water 14 and/or partially or totally buried in the bed 18 of the body of water 14.

In this example, the pipe 16 is a production pipe line (referred to as "flowline" as per the accepted terminology) connecting a fluid collection assembly (not represented) to a riser. By way of a variant, the pipe 16 is a gas injection pipe ("pipe" or umbilical) for injecting gas or pipe used for alternating injection of gas and water.

The pipe 16 is for example a rigid pipe formed of at least one metal tube or a flexible pipe comprising at least one pressure sheath made of thermoplastic material and tensile armors.

The pipe 16 may or may not comprise a thermally insulating layer, with this layer possibly being of a significant thickness, that makes it possible to achieve insulation levels that are less than 1 W/m²·K. By way of an example, the pipe 16 shown in FIG. 1 comprises a first section 20 that projects outward from the bed 18 of the body of water, a second section 22 that is buried at a shallow depth, for example at a depth measuring less than the external radius of the pipe 16 and a third section 24 that is buried at a greater depth, greater than the external radius of the pipe 16.

Figure 3:
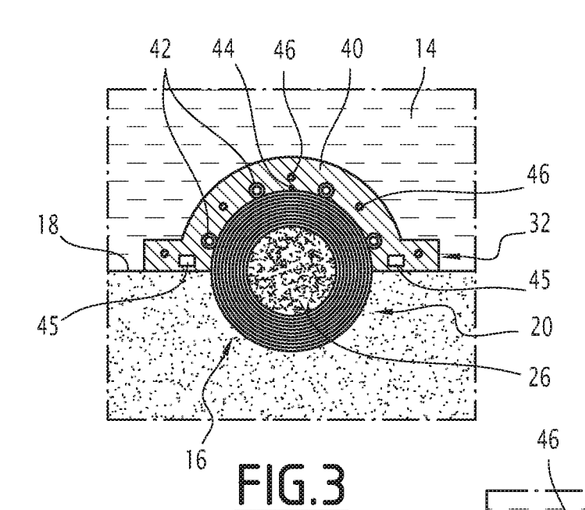
FIG. 3 is a cross sectional view taken along the transverse plane III of FIG. 1.
Figure 4:
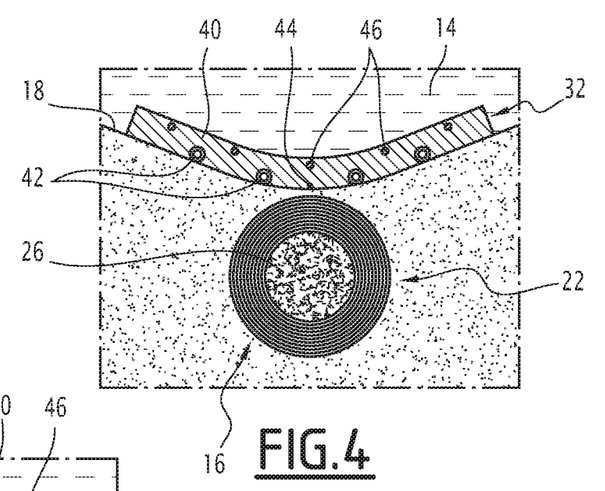
FIG. 4 is a cross sectional view taken along the transverse plane IV of FIG. 1.
Figure 5:
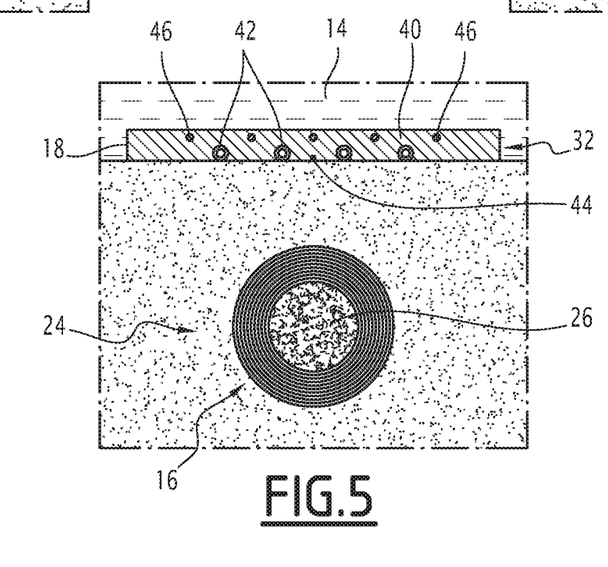
FIG. 5 is a cross sectional view taken along the transverse plane V of FIG. 1.

The pipe 16 delimits an internal circulation passage 26 for circulating the fluid, as visible in FIGS. 3 to 5. The fluid circulating in the pipe is for example a hydrocarbon fluid comprising at least one compound that is very prone to solidifying in the internal passage 26 at a temperature comprised between −40° C. and 50° C., in particular between −5° C. and 25° C.

The compound that is prone to solidifying is for example a hydrate, a wax, ice and/or a gel of paraffins and/or of asphaltenes.

The solidified compound is very prone to accumulating on the walls of the pipe, and in certain critical cases, to forming plugs 28 as represented schematically in FIG. 1.

In the example represented in FIG. 1, the operating assembly 10 is intended to be deployed so as to be facing the pipe 16 in order to heat the fluid contained therein, and to bring about at least partial melting of the solidified compounds.

The operating assembly 10 is advantageously deployed from a floating surface installation 30, such as a vessel. Any kind of installation vessel may be used, preferably a conventional installation vessel, or possibly a special vessel specifically compliant with ATEX standards.

According to the invention, the operating assembly 10 includes a removable cover 32 that is intended to be placed so as to be facing the pipe 16, an activation, control and monitoring unit 34, for activating, controlling and monitoring the heating brought about by the cover 32, that is advantageously carried by the surface installation 30, and a flexible link 36 connecting the unit 34 to the cover 32 through the body of water 14.

In this example, the operating assembly 10 further also comprises a winding device 38 for winding the cover 32, which is carried by the surface installation 30.

The removable cover 32 is here designed to interact with the pipe 16 in order to heat it. It is adapted so as to be applied in a reversible manner on to an outer surface of the pipe 16 when the pipe 16 projects outwards from the bed 18 of the body of water 12 and/or on a bearing surface formed by the bed 18 of the body of water 12, so as to be facing the pipe 16 when the pipe 16 is buried.

The removable cover 32 includes a flexible elongate body 40, and at least one interaction element 42, 44 for interacting with the pipe 16 comprising in this example at least one longitudinal heating element 42, and at least one longitudinal temperature sensor 44 for measuring the temperature, the heating element 42 and the longitudinal sensor 44 being carried by the body 40.

Figure 2:
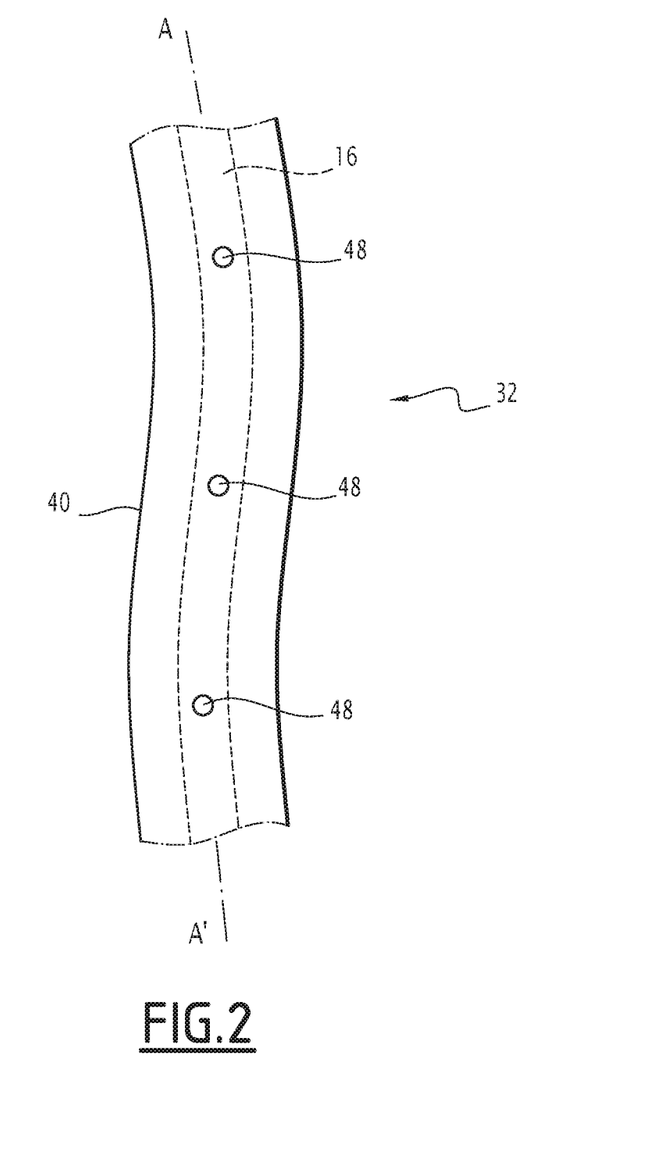
FIG. 2 is a partial top view of a removable heating cover according to the invention.

Advantageously, the removable cover 32 has longitudinal internal armor 46, disposed in the body 40, in order to increase its tensile strength. The cover 32 additionally also comprises in this example the exterior handling members 48, which are visible in FIG. 2, and adapted so as to be gripped by a remotely controlled underwater vehicle ("Remotely Operated Vehicle" or "ROV" as per the accepted terminology), for adjusting the position of the body 40 in relation to the pipe 16.

The elongate body 40 is made from a flexible material, and is reversibly deformable so as to fittingly adapt to the form and shape of the surface on which it is applied.

In this instance it has the shape of a planar layer with a polygonal transverse cross section delimited towards the bottom by a lower surface and towards the top by an opposite upper surface.

The elongate body 40 advantageously includes a ballast element 45, which is capable of causing the deformation of the elongate body 40 under the effect of its weight and of enabling the retention in position thereof on the surface on which it is applied.

The ballast element 45 is also capable of ensuring a secured stationary position during the installation, while effectively withstanding the marine currents during installation.

Indeed, the ballast element 45 provides a negative buoyancy necessary to obtaining an acceptable hydrodynamic behavior during the installation phase (passage through the water column).

In one embodiment, the ballast element 45 is distributed in an asymmetrical manner, for instance by ballasting to a far greater extent the front of the elongate body 40 than the rear thereof.

Thus, during the installation, the cover 32 plunges to the bottom in a vertical manner, with its front portion relatively immobile in the currents on account of the ballast, and with its rear portion drawn into the currents, just like a flag in the wind. This is of great interest with respect to the phase of approaching the ground, during which it is important for the ground gripping point to be sufficiently ballasted in order to avoid being dragged over the ground under the effect of the current, which would run the risk of causing damage thereto but would also add complexity to the task of positioning it so as to be facing the pipe 16.

The ballast element 45 is for example formed by the crimping of a metal rod positioned longitudinally along the elongate body 40, or even of steel plates, of encapsulated lead, discontinuous in two planes so as to allow for the winding and storage thereof on the surface installation 30 and the monitoring of the terrain profile, as well as of the pipe profile 16 itself. Alternatively, metal cables, for example made of steel are used for combining added mass and absorption/transfer of installation stresses.

Additionally the flexibility of the body 40 is further appropriate for enabling the winding of the removable cover 32 over the winding device 38 and the unwinding thereof from the winding device 38, without significant plastic deformation.

The elongate body 40 is for example made from an elastomeric material of such type as rubber or polyurethane. Its thickness may be comprised between 50 mm and 100 mm. The cover may also take the form of a honeycomb-like structure of such a type as is based on the NIDA technology.

The honeycomb-like structure preferably includes a layer of adjacent cells interposed between two continuous sheets.

The cells of the honeycomb may be filled with airgel and in particular powdered airgel. The sheets may be made from elastomeric material such as rubber.

By way of a variant, the elongate body is made of syntactic foam, for example based on polypropylene with glass microspheres. In this case, and as the material is relatively rigid, the syntactic foam will be in the form of juxtaposed blocks.

The blocks like the cells of the honeycomb preferably have maximum dimensions measuring less than 30 cm and in particular of the order of 20 cm.

Preferably, the elongate body 40 is thermally insulating. It advantageously presents a thermal conductivity of less than 0.3 W/m·K, and in particular comprised between 0.1 W/m·K and 0.3 W/m·K.

It is thus capable of directing the heat generated by each heating element 42 to the pipe 16.

According to the invention, the length of the elongate body 40 is greater than at least 10 times its width, in particular at least 100 times its width.

The length of the elongate body 40 is greater than 10 m, in particular greater than 100 m, preferably greater than 1 km.

The width of the elongate body 40 is less than 5 m, and is in particular less than 2 m.

According to one advantageous feature of the invention, the width of the elongate body 40 is greater than the diameter of the pipe 16, preferably measuring at least twice the diameter of the pipe 16, in a manner so as to facilitate the installation of the cover 32, without having to ensure centering of the said cover 32 over the pipe 16. When the pipe is arranged above the sea bed, the width of the elongate body 40 is advantageously greater than the perimeter of the pipe and preferably greater than 2 times the perimeter.

Indeed, when operating over several kilometers of sea bed, it becomes burdensome and difficult to perfectly adjust the middle part of the cover 32 in relation to the axis of the pipe 16. Thus, a large width makes it possible to maintain the full effectiveness thereof while the cover 32 is slightly offset from the axis of the pipe 16.

When the length of the elongate body 40 is very much greater than its width, the cover 32 is thus capable of heating the pipe 16 over a great length, in particular in order to remove build-ups of solidified compounds, without necessarily having to precisely locate the longitudinal position of these compounds prior to the intervention.

As previously indicated above, the elongate body 40 is capable of deforming spontaneously so as to fittingly adapt itself to the surface on which it is applied. In the example shown in FIG. 4, the body 40 thus has a channel-shaped form covering pipe 16 and delimiting a hollow for receiving the pipe 16.

In the example represented in FIGS. 4 and 5, the body 40 has a form that is respectively concave and substantially planar, corresponding to the configuration of the bed 18 of the body of water 14, directly aligned above the pipe 16.

In the example illustrated in FIGS. 3 to 5, the removable cover 32 includes a plurality of longitudinal heating elements 42, which are laterally spaced apart from each other. In this example, the removable cover 32 includes four parallel heating elements 42. In one variant of the embodiment represented in FIG. 10 and FIG. 12, the removable cover 32 includes ten 42 parallel heating elements. In other variants of the embodiment that are not represented, the removable cover 32 may include more than ten parallel heating elements 42.

Each heating element 42 extends advantageously over more than 90% of the length of the body 40. An excess length is provided for in particular when the cover 32 is intended to be wound and when the heating elements 42 are not structural load-bearing or supporting elements. This extra length is a function of the distance to the neutral axis of winding. This extra length makes it possible to avoid the excessive compressive and tensile stresses appearing between the wound and unwound position.

In one embodiment, the heating elements 42 extend so as to be parallel to the local axis A-A' of the body 40. By way of a variant, they generally extend in an overall parallel fashion, with the heating elements 42 having local curvatures in the form of zigzags.

In other embodiments, at least one heating element 42 runs across the body 40 while forming zigzags whose width corresponds to the width of the body 40. By way of a variant, at least one heating element 42 is a heating wire mesh that is uniformly distributed over the surface of the body 40.

Each heating element 42 is in this instance partially embedded in the body 40, so as to have at least one generatrix flush with a lower surface of the body 40. In some variants of the embodiment, the heating elements 42 are fixed so as to project outwards below the body 40. In order to not be in direct contact with the underlying ground, which could contribute to the risk of degradation of the heating elements 42, the body 40 has rigid over-thickened portions on both sides of the heating elements 42, to be applied on the ground.

Advantageously, each heating element 42 is formed by an electrical resistor that is capable of generating heat as a result of the Joule effect, when it is electrically powered by the unit 34, via the connection 36.

In the case of the heating cover 32, the heating elements 42 may be in direct contact with the water and the ambient pressure. Thus, they advantageously comprise a protection means for protecting against corrosion and compression, or are made out of materials that are resistant to such stresses or strains.

The linear power output delivered by the heating elements 42 is in particular greater than 50 W/m, in particular comprised between 100 W/m and 300 W/m, more generally in some cases, comprised between 100 W/m and 500 W/m.

The or each temperature sensor for measuring temperature 44 is for example formed by a fiber optic linear sensor of such type as a distributed temperature sensor ("Distributed Temperature Sensing" or "DTS"), Bragg fiber sensor, or fine grid sensor.

The temperature measuring sensor 44 extends advantageously over more than 90% of the length of the body 40, so as to be parallel to the local axis A-A' of the body 40.

It is positioned to be flush with a lower surface of the body 40 in order to be placed in contact with the surface heated by the body 40.

It is advantageously placed along the central axis A-A' of the body 40, transversely at a distance away from each heating element 42, preferably between two adjacent heating elements 42.

The sensor 44 is capable of generating a signal that is representative of the local temperature of the interior surface of the body 40 with a resolution for example of the order of 1 m along the body 40.

The representative signal is collected by the unit 34 in order to ensure monitoring of the local temperature of the body 40, during the heating operations.

A plurality of sensors 44 or portions of sensors 44 may be arranged in the width of the body 40, with the objective of determining, by means of studying the temperatures, the centring of the body 40 of the cover 32 over the pipe 16.

Figure 8:
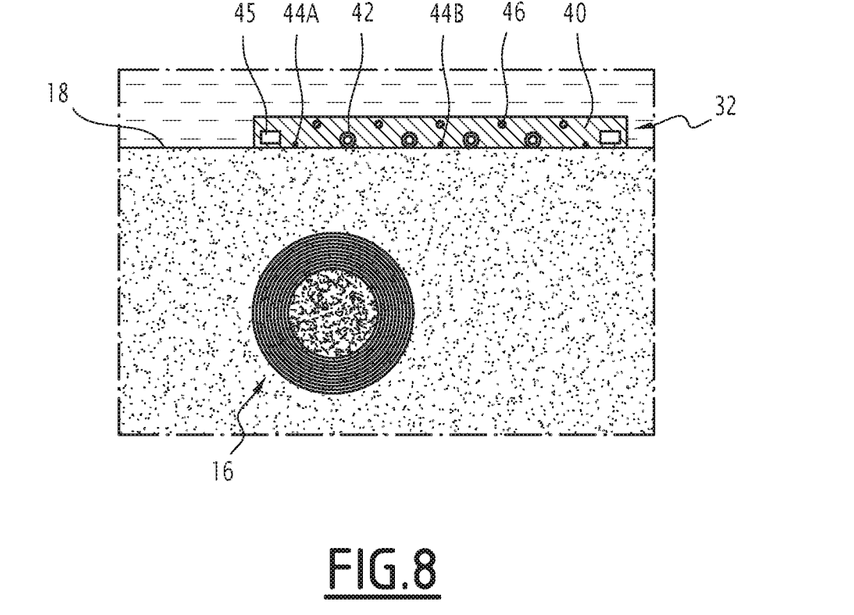
FIG. 8 is a view that is analogous to the one in FIG. 5, when the cover is off-centre in relation to the pipe.
Figure 9:
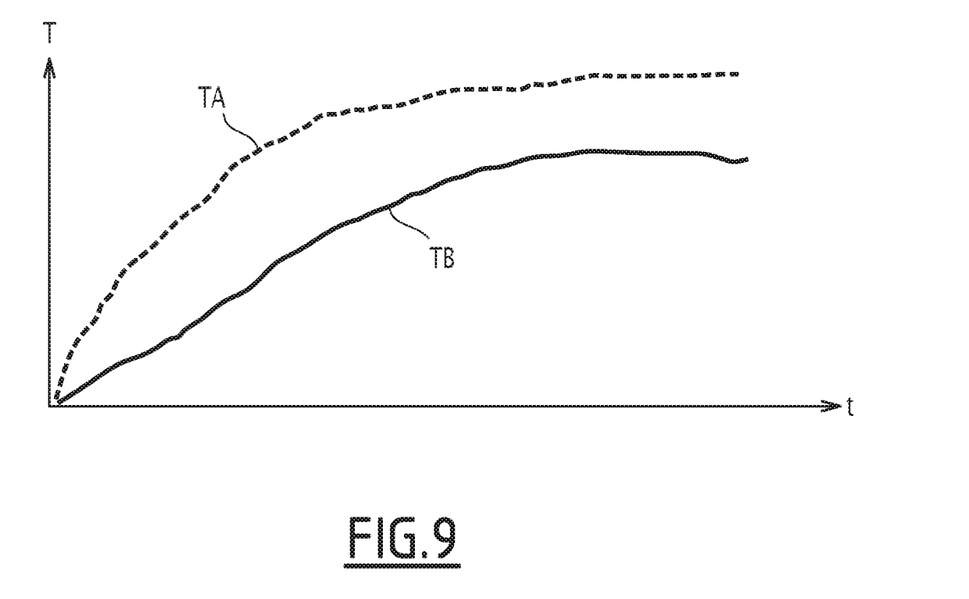
FIG. 9 is a graph comparing the changes in temperature as measured by a sensor situated at the centre of the central body of the cover and by a sensor situated at the periphery.

This is illustrated in FIG. 8 and FIG. 9 which shows that the sensor 44A situated at the periphery of the body 40 displays at each time instant a temperature TA that is higher than the temperature TB of the sensor 44B situated at the center of the body 40.

The position of the body 40 can advantageously be corrected at a later stage by a remotely operated underwater vehicle.

When the sensor 44 is formed by an optical fiber, the body 40 may receive a plurality of longitudinal optical fibers, or even a single optical fiber which extends back and forth along the body 40.

In practice, the unit 34 comprises an analysis unit ("monitoring unit" as per the accepted terminology) for each optical fiber and the link 36 includes a dedicated optical fiber umbilical channel.

Thus, the use of a single optical fiber that extends back and forth requires only one analysis unit and only one umbilical channel, which reduces the cost. Conversely, a plurality of analysis units provide for better discretization over great lengths.

The armor elements 46 extend longitudinally in the body 40. They are for example formed by metal and/or composite wires. Each armor element 46 is embedded in the body 40, being disposed at a distance away from the heating elements 42.

The presence of the armor elements 46 stiffens the body 40 along the axis A-A', while also maintaining its deformability along other directions.

The handling elements 48 project outwards from an upper surface of the body 40. They are adapted so as to be gripped by a tool of a remotely operated underwater vehicle for adjusting the local position of the body 40.

The handling elements 48 are for example handles, cords, etc.

They are distributed longitudinally along the body 40.

The actuating, control and monitoring unit 34 is connected to the removable cover 32 in order to activate the heating elements 42 and control their heating and to monitor the measurement of temperature performed by the sensor 44. The unit 34 is thus capable of monitoring the local temperature of the body 40 along the pipe 16, and of controlling the temperature on the basis of measurements performed by the sensor 44.

The link 36 is for example formed by a flexible hose such as an umbilical. It comprises at least one electrical supply line for supplying electrical power to each heating element 42, and an information transfer line, connected to the temperature measuring sensor 44.

The winding device 38 comprises a drum or a basket mounted so as to be rotatable on the surface installation 30 about an axis B-B' of winding. It is adapted so as to enable the winding of the body 40 with a minimal radius of curvature that is greater than 2 m and, for example comprised between 2 m and 4 m.

A first operational intervention method according to the invention for performing interventions facing a pipe 16 underwater will now be described.

Initially, the removable cover 32 is loaded on the winding device 38 of the surface installation 30, being wound about the axis B-B' of the device 38.

The surface installation 30 is then brought to the vicinity of the pipe 16. A free end of the removable cover 32 is unwound and is submerged in the body of water, for example by means of a remotely operated vehicle, in order to be positioned on the pipe 16, when the latter is accessible, or on a point situated vertically to be facing the pipe 16, when the latter is buried.

The removable cover 32 is then progressively unwound and laid longitudinally along the path line of the pipe 16.

As previously indicated above, the cover 32 plunges to the bottom in a substantially vertical manner, with at least its front portion relatively immobile in the currents on account of the ballast element 45. The overall weight of the cover 32 confers it with a stability and a resistance to sea currents during its vertical descent.

The great flexibility of the body 40 makes it possible for the cover 32 to precisely follow the path line of the pipe 16. The body 40 being deformable under the effect of its own weight, it closely adheres to the form and shape of the surface on which it is laid, it being possible for this surface to be the pipe 16 itself in the section 20 that is seen in FIG. 3, or the bed 18 of the body of water 14 when the pipe is buried in shallow water, as in FIG. 4 for the section 22, or at a greater depth, as shown in FIG. 5 for the section 24.

The long length of the body 40 of the cover 32 does not require precisely locating the areas where there could be any potential solid build-ups or plugs 28 in the pipe 16, since the pipe 16 is treated in a comprehensive manner over the entire length of the cover 32.

Additionally a link 36 is also put in place through the body of water 18 between a point on the cover 32 and the unit 34 situated on the surface installation 30.

The link 36 electrically connects the unit 34 to each heating element 42. It also connects the unit 34 with the temperature sensor 44 for measuring the temperature.

In the event where a plurality of sensors 44 are present, the link 36 preferably comprises a plurality of channels and thus connects a plurality of sensors 44 to one or more central units.

Then, the unit 34 activates each heating element 42. The body 40 being made at least partially from insulating material, the heat generated by each heating element 42 is directed mainly through the lower surface of the body 40, to the pipe 16 by direct contact with the pipe 16, or by transmission of heat through the bed 18 of the body of water 14.

The heat generated by the heating elements 42 heats the contents of the pipe 16 in the internal passage 26, thereby making possible the at least partial dissolution of the solid compounds formed in the passage 26, and the dislodging of any possible plugs 28, over the entire length of the body 40.

Figure 6:
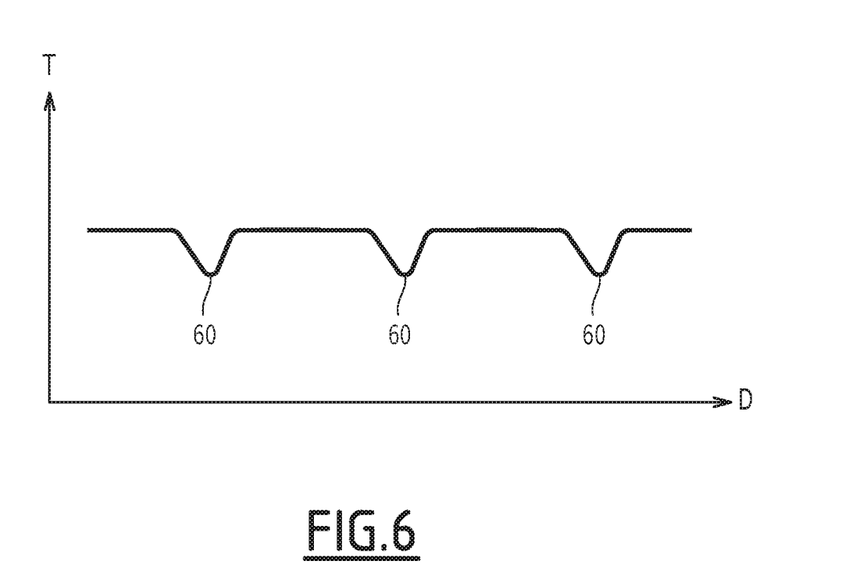
FIG. 6 is a graph illustrating the temperature measured, as a function of the longitudinal position, by the longitudinal temperature measuring sensor that is integrated into the removable cover.

During the heating process, the unit 34 monitors the change and evolution of the local temperature of the body 40 along the pipe 16. As illustrated in FIG. 6, the zones 60 locally having a lower temperature are generally associated with a solid build-up in the pipe 16 and at times with plugs 28.

Figure 7:
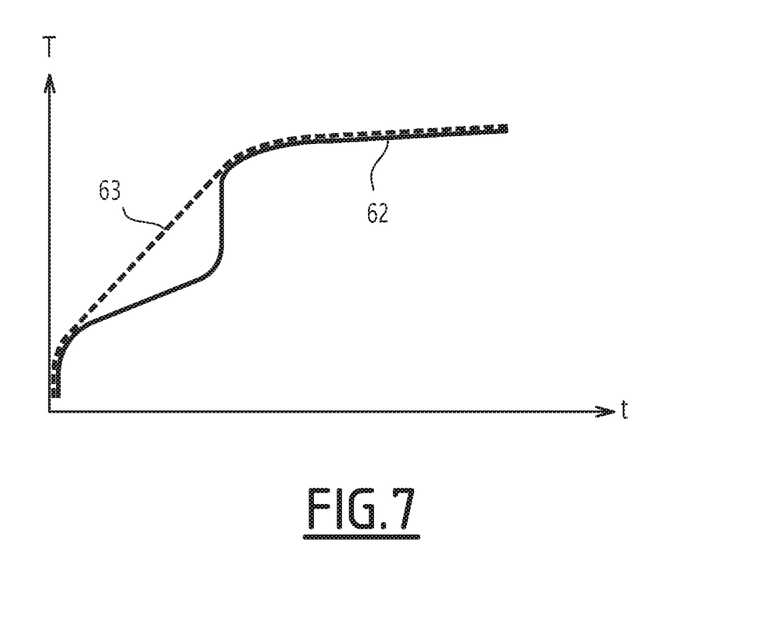
FIG. 7 is a graph illustrating the temperature measured, as a function of time, by the longitudinal measuring sensor integrated into the removable cover opposite a given point on the pipe initially having a plug.

The unit 34 also monitors the local evolving change in the temperature of the body 40 as a function of time, for each zone 60 having solid build-up, in order to determine the stabilization of this temperature 62 representative of the disappearance of the solid build-up, as illustrated in FIG. 7, which compares the evolving change 62 in the presence of a plug to the changes 63 evolving in the absence of plugs, for an essentially liquid flow.

Once the sections 20 to 24 of the pipe 16 have been treated, the cover 32 may be moved to other sections of the pipe 16, for example by pulling it by making use of at least one remotely operated underwater vehicle, or by raising it up on to the surface installation 30 and by winding it over the device 38.

The cover 32 according to the invention is thus particularly simple to set in place and move through the body of water 14. The flexibility of its body 40, possibly associated with the presence of ballast members 45, substantially adapts the conformation of the body 40 to the configuration of the pipe 16 regardless of whether it is accessible or buried.

At a minimum, the inflow and outflow of water by natural convection or by the current is prevented during the heating. A "hermetic" seal to the water circulation is advantageously created, possibly with one or more pockets of water enclosed therein. The efficiency of the heating is naturally better in the absence of water pockets.

The great length of the body 40 of the cover 32 comprehensively ensures a global treatment of a large length of the pipe 16, without the need to precisely determine where any possible build-ups of solid compounds, and in particular the plugs 28 may be located.

An effective thermal insulation is provided by the body 40 for directing the heat generated by the heating elements 42 to the pipe 16, thereby minimising the losses.

The cover 32 makes it possible to treat very effectively and rapidly any possible solid build-ups in the pipe 16 without necessarily requiring any interruption in production.

The presence of a longitudinal temperature sensor for measuring the temperature 44 makes it possible to locate any potential solid build-ups, and to verify the disappearance thereof.

In addition, the cover 32, possibly provided with internal armor elements 46 in order to ensure its longitudinal rigidity, can be wound over a winding device 38, thereby facilitating the storage and handling thereof on a surface installation 30.

In one variant, a plurality of covers 32 as described here above are mounted in series with each other so as to form a heating assembly 10 measuring a greater length.

In another variant, the heating elements 42 are not necessarily electrical resistors, but are formed by fluid circulation conduits for circulating a hot heat-transfer fluid.

By way of a variant, the cover 32 is devoid of heating elements 42 or comprises inactive heating elements 42. It comprises only one or more interaction elements for interacting with the pipe 16 formed by temperature sensors for measuring the temperature 44, in order to ensure passive monitoring of the pipe 16 during the course of production, without heating.

In another variant, the cover 32 is installed in a permanent manner on to the lines set in place which require insulation or active heating following an evolutionary change of the production profile. In this case, the control and injection of power are performed from a production platform.

A variant of a removable cover 32 according to the invention is illustrated in FIGS. 10 to 15. In this variant, the elongate body 40 comprises a plurality of adjacent longitudinal strips 200 that are longitudinally joined in an articulated manner to each other and an articulated hinge joint between the strips 200, formed by a common sheet 202.

Figure 12:
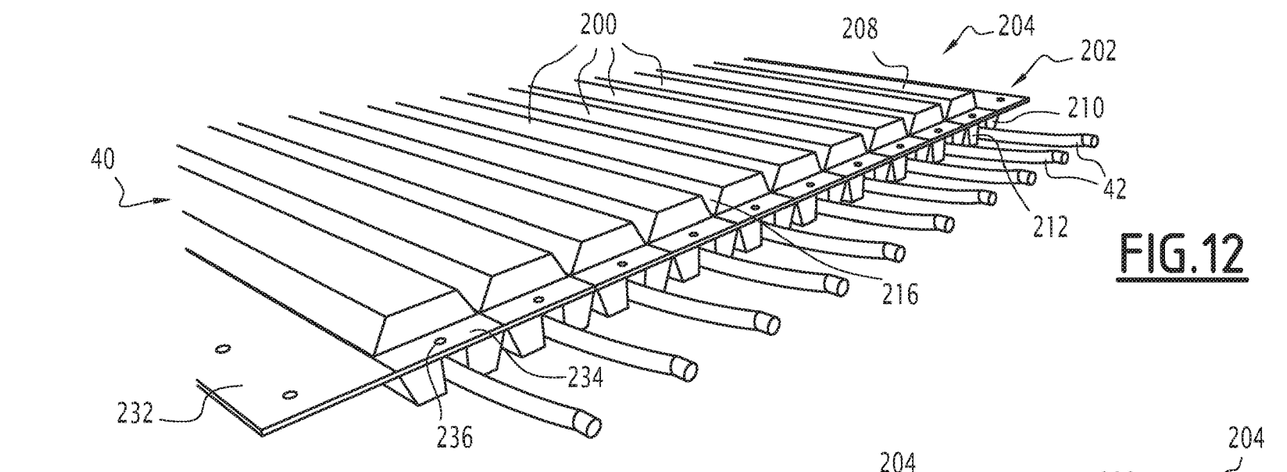
FIG. 12 is a partial view in perspective of the extreme or end part of a component piece intended for forming the elongate body of the cover shown in FIG. 10.
Figure 13:
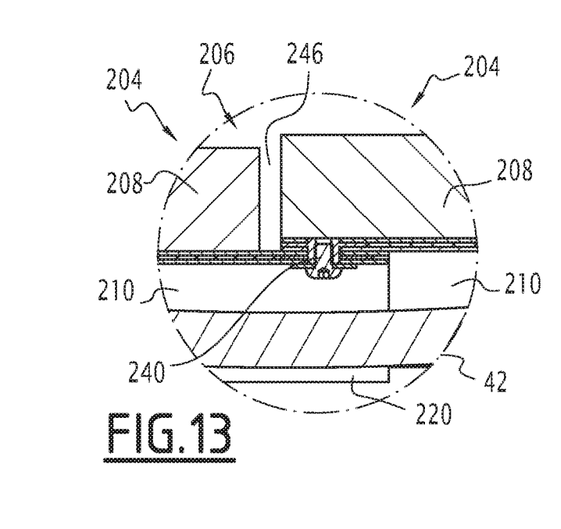
FIG. 13 is a view taken in cross section along an axial plane, illustrating the longitudinal joining assembly between two successive component pieces forming the elongate body of the cover shown in FIG. 10.

In this example, as illustrated in FIG. 12, the elongate body 40 comprises a plurality of successive longitudinal elements 204, that are assembled to be longitudinally joined to each other, and assembling elements 206 for assembling successive pieces 204, that are visible in FIG. 13.

The longitudinal strips 200 in this instance extend over the entire length of the elongate body 40. Each longitudinal strip 200 is joined in an articulated manner to an adjacent longitudinal strip 200 along a longitudinal edge of the strip 200.

In this example, each longitudinal strip 200 comprises an upper segment 208 and a lower segment 210, assembled on either side of the sheet 202.

At least one longitudinal strip 200, here each longitudinal strip 200, defines a lower groove 212 intended for accommodating at least one longitudinal interaction element 42, 44 for interacting with the pipe 16.

Each segment 208, 210 has an entirely prismatic form. In the example represented in FIG. 11, the transverse cross section of each segment 208, 210 is constant over substantially the entire length of the segment 208, 210. This section for example is in the form of a quadrilateral, here in the form of a trapezoid.

Each segment 208, 210 has lateral surfaces 214 that are inclined towards one another and in relation to the vertical by an angle advantageously comprised between 15° and 45°, preferably between 20° and 30°.

Thus, each longitudinal strip 200 is movable in rotation about a longitudinal axis D-D' by means of the hinge joint, thanks to the space 216 provided between the inclined lateral faces 214 positioned to be facing two adjacent segments 208 or 210.

The segments 208, 210 are made out of insulating material, for example from the polymeric materials mentioned here above for the manufacture of the body 40. Preferably, the material is resistant to ultraviolet light or has a coating that is resistant to ultraviolet light.

The polymer material of the segments 208, 210 is chosen so as to have adequate flexibility to enable being wound over a barrel or drum. Preferably, the polymer material of which each segment 208, 210 is formed, is capable of being elastically deformed to achieve an elongation of at least 5%.

The segments 208, 210 are fastened on to the sheet 202 by means of bonding, heat-sealing, and/or preferably by vulcanization.

Preferably, each segment 208, 210 is fastened on to the sheet 202 over the entire surface applied on to the sheet 202, in order to ensure a constant mechanical connection along the entire length and so as to prevent zones of detachment that may promote circulation of water.

Figure 14:
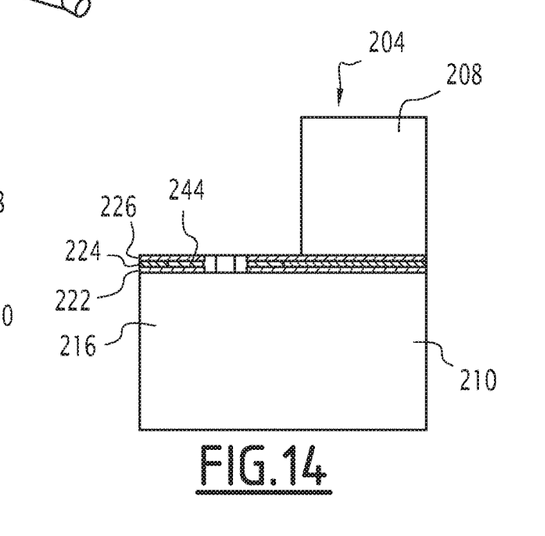
FIG. 14 is a cross sectional view of the longitudinal ridge of a first component piece intended to form the elongate body.
Figure 15:
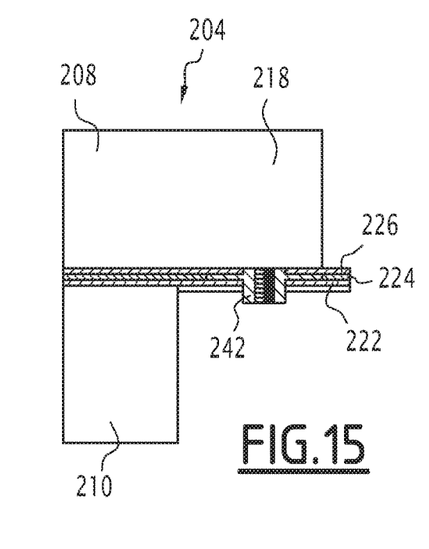
FIG. 15 is a cross sectional view of the additional complementary longitudinal ridge of a second component piece intended to form the elongate body, by means of a joining assembly with the first component piece.

As described in FIGS. 14 and 15, for each successive piece 204, each lower segment 210 projects outward axially beyond the upper segment 208 to a first extremity of the piece 204 in order to define a support ridge 216 intended for supporting an adjacent piece 224.

For each successive piece 204, each upper segment 208 projects outward axially beyond the lower segment 210 to a second extremity opposite the first extremity in order to define a cooperation ridge 218 for cooperating with the support ridge 216 of an adjacent piece 204.

In this example, the groove 212 is formed longitudinally in each lower segment 210. It opens downwards.

The interaction element 42, 44 is housed in the groove 212. It is fastened under the strip 220 at the bottom of the groove 212 by means of the retaining members 220, such as rings and/or clamping brackets spaced out at a predetermined distance from each other in order to control the sliding of the element 42, 44 in relation to the elongate body 40.

Preferably, the interaction element 42, 44 is disposed at the level of the neutral axis of winding of the elongate body 40 at the bottom of the groove 212. This limits the stresses or strains that are applied on the interaction member 42, 44 when the elongate body 40 is wound over a barrel or over a drum.

The ballast elements 45 are molded and/or are extruded into a segment 208, 210 of a strip 220 or are directly attached thereto for example by screwing by means of a self-drilling screw.

The sheet 202 is common to all of the longitudinal strips 200 of one given piece 204.

The sheet 202 is more flexible than each segment 208,210 so as to be deformed by torsion during the relative rotation of each strip 200 in relation to an adjacent strip 200.

The sheet 202 has a thermal conductivity measuring preferably less than 0.1 W/(mK). This makes it possible to provide for thermal insulation in the interstices between the adjacent strips 200.

The sheet 202 has a thickness that is greater than 5 mm, preferably greater than 6 mm. The thickness of the sheet 202 is optimized so as to maintain a certain flexibility, while also providing for a satisfactory level of thermal insulation.

In the example represented in FIGS. 14 and 15, the sheet 202 comprises a plurality of layers assembled on top of each other, for example by calendering. It thus includes at least one interior layer 224 made from polymer material, for example from elastomer material, in particular polychloroprene or even polyamide; at least one intermediate textile layer (not represented), for example multiple textile layers arranged to be placed at 45° relative to each other, in order to ensure the absorption/transfer of stresses or loads in a plurality of directions, one intermediate layer 224 made of polymer and/or one top layer 226 made of polymer material, for example, of chlorosulfonated polyethylene, or even ethylene-propylene-diene monomer.

The top layer 226 and the bottom layer 224 are preferably resistant to weathering, abrasion, and corrosion. In addition the top layer 226 is preferably also resistant to ultraviolet light.

Figure 11:
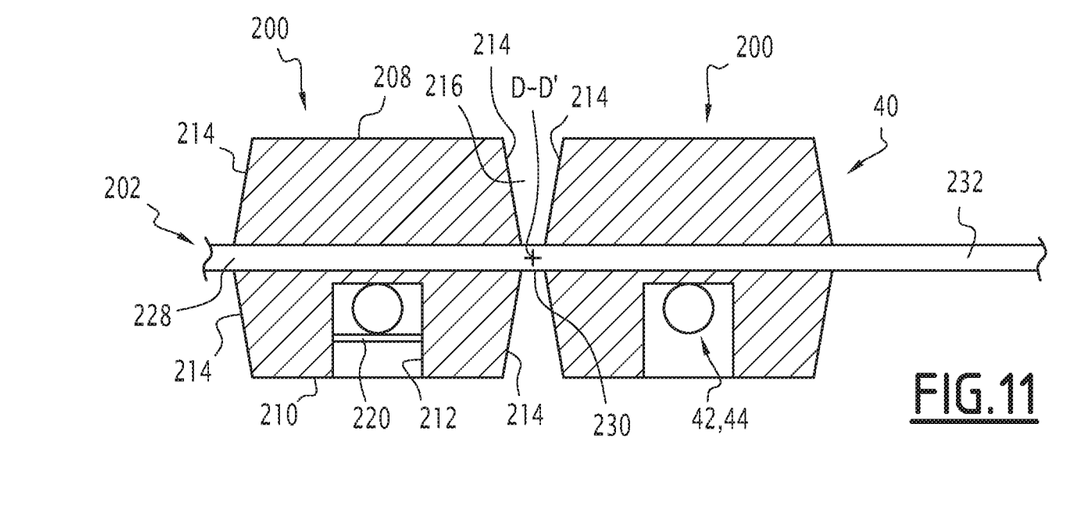
FIG. 11 is a view of a detail marked XI in FIG. 10.

With reference to FIG. 11, the sheet 202 thus defines a plurality of support regions 228 for supporting the longitudinal strips 200, and between each pair of support regions 228, 230 the longitudinal hinge joints situated between the longitudinal strips 200.

Additionally the sheet 202 further defines, laterally on either side of each piece 204, a lateral skirt 232, and at the axial extremities (end parts) of each piece 204, a support strip 234 for supporting the assembling elements 206, that are visible in FIG. 12.

The lateral skirt 232 projects outward laterally relative to the longitudinal strips 200. It is adapted so as to rest on the sea bed and is capable of isolating longitudinally the space beneath the elongate body 40 from the rest of the marine environment.

The support strip 234 rests on the support ridges 216 of each lower segment 210 at a first extremity of the piece 204. It is fastened under the cooperation ridges 218 at a second extremity of the piece 204.

The support strip 234 defines a plurality of through-passage orifices 236 for the assembling elements 206 to pass through.

The assembling elements 206 comprise at least one coupling member 240, as is visible in FIG. 13, which is inserted into the through-passage orifice 236 and intended for connecting the support strips 234 of two successive adjacent pieces 204 to each other. In this example, the assembling elements 206 further also includes a receiving member 242 for receiving the coupling member 240, that is integrally secured to a first support strip 234, and a reinforcing member 244, that is integrally secured to a second support strip 234.

In this example, the coupling member 240 is a bolt. By way of a variant, it is formed by a rivet or by another member passing through the strips 234.

The receiving member 242 comprises a sleeve disposed through the orifice 236 of the support strip 234 and a retaining collar for retaining the sleeve 242, interposed between the bottom layer 222 and top layer 226 of the sheet 202 at the level of the support strip 234.

The reinforcing member 244 is for example formed by an eyelet surrounding the orifice 236 of the support strip 234 opposite the one that has the receiving member 242. The eyelet is interposed between the bottom layer 222 and the top layer 226 of the sheet 202.

In order to fasten the successive pieces 204, each coupling member 240 is introduced into a receiving member 242 through the retaining member 244. The support strips 234 are thus then assembled to be one on top of the other.

The support ridge 216 thus then bears the cooperation ridge 218.

The lower segments 210 are then placed in contact with one another, whereas a longitudinal clearance space 246 continues to exist between the upper segments 208. This clearance space promotes the winding 246 of the elongate body 40 over a barrel or a drum, while maintaining in position the upper segments 208 to be directed towards the barrel or the drum.

In order to fabricate the elongate body 40, each piece 204 first needs to be produced. To this end, the upper segments 208 and lower segments 210 of each strip 200 are fastened to the common sheet 202 so as to be parallel to each other. The upper segments 208 and lower segments 210 are axially offset in order to form respectively the lower support ridge 216 and the upper cooperation ridge 218 at the opposite extremities of the piece 204.

Thereafter, the successive pieces 204 are then assembled to be joined to each other in series. The coupling members 240 are inserted between the support strips 234 placed in contact with one another and cooperate with the receiving members 242 in order to complete the assembly.

This ensures that the upper cooperation ridge 218 is maintained in contact with the lower support ridge 216. The upper cooperation ridge 218 covers the assembling elements 206, thus preventing thereby, the creation of thermal bridges between the space situated beneath the elongate body 40 and the space situated above the elongate body 40.

In addition, the staggered arrangement 208 of upper segments and lower segments 210 limits the circulation of water at the level of the junction. Advantageously, a seal is introduced between the support strips 234 in order to further improve the sealing of the assembly.

This having been done, the elongate body 40 is wound over a barrel or over a drum. During this winding, the interaction elements 42, 44 for interacting with the pipe 16 are introduced into the grooves 212 and the retaining members 220 are put in place.

The putting in place of the elements 42, 44 during the winding limits the stresses or strains that are applied to these elements 42, 44, which reduces the risk of degradation under the effect of the stresses or strains, in particular following a plurality of windings/unwindings.

The setting in place of the cover 32 thus formed is in addition analogous to that described previously. It is done for example by means of a tensioner and/or a traction winch.

Figure 10:
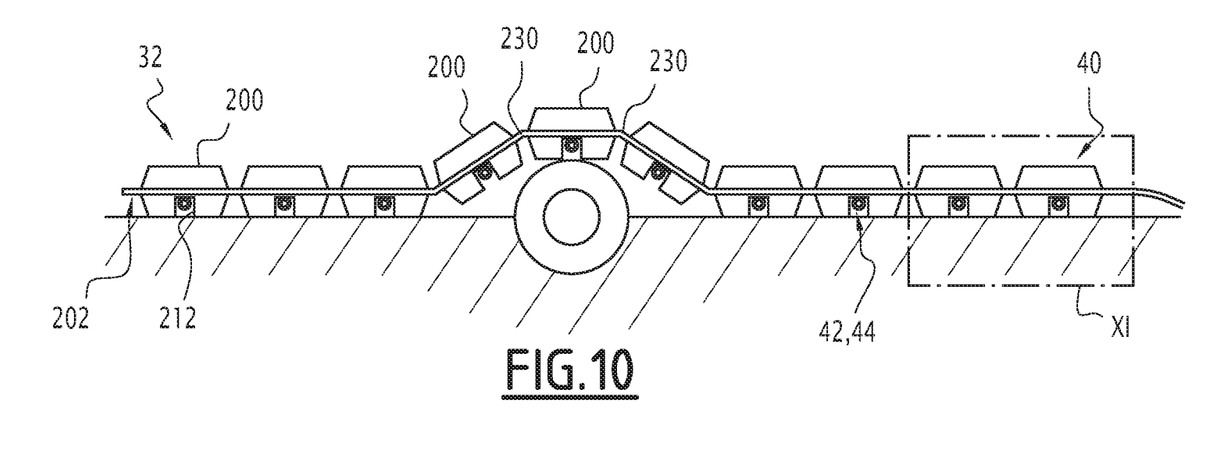
FIG. 10 is a view that is analogous to the one in FIG. 3 of a variant of a heating cover according to the invention.

The presence of longitudinal hinge joints 230 between the strips 200 makes it possible for the cover 32 to deform by rotation about the longitudinal axes in order to conform and adhere as closely as possible to the form and shape of the pipe 16, regardless of its size, as illustrated in FIG. 10.

By way of one variant, the elongate body 40 is integrally formed as one single piece, and not trough an assembly of multiple pieces 204.

By way of another variant, the longitudinal strips 200 are axially discontinuous. The segments 208, 210 thus then exhibit a shape of a "chocolate bar".

The invention claimed is:

1. A removable cover intended to be applied to be facing a fluid transport pipe submerged in a body of water, comprising:
   an elongate body, configured to be applied facing an outer surface of the pipe;
   at least one longitudinal interaction element for interacting with the pipe, supported by the elongate body;
   wherein the elongate body is reversibly deformable under the effect of its own weight, the elongate body having a length greater than 100 m.

2. The cover according to claim 1, wherein the at least one longitudinal interaction element for interacting with the pipe is a longitudinal temperature measurement sensor for measuring the temperature, borne by the elongate body.

3. The cover according to claim 2, wherein the longitudinal temperature measuring sensor extends over at least 90% of the length of the elongate body.

4. The cover according to claim 1, further comprising at least one ballast element borne by the elongate body.

5. The cover according to claim 1, wherein the elongate body is configured to be wound in a reversible manner over a rotating storage.

6. The cover according to claim 1, further comprising at least one longitudinal reinforcing armor borne by the elongate body.

7. The cover according to claim 1, further comprising at least one handle configured to be gripped by a remotely operated underwater vehicle.

8. The cover according to claim 1, wherein the elongate body comprises a thermally insulating material.

9. The cover according to claim 1, wherein the at least one longitudinal interaction element for interacting with the pipe is a longitudinal heater.

10. The cover according to claim 9, wherein the longitudinal heater comprises an electrical heating resistor.

11. The cover according to claim 1, wherein the elongate body comprises a plurality of adjacent strips longitudinally hinged to each other, the at least one longitudinal interaction element for interacting with the pipe being borne by a strip.

12. The cover according to claim 11, wherein at least one of the strips delimits a lower groove for accommodating the at least one longitudinal interaction element.

13. The cover according to claim 11, wherein each strip comprises at least one lower segment, at least one upper segment, the elongate body comprising a hinge joint disposed between the at least one lower segment and the at least one upper segment.

14. The cover according to claim 13, wherein the at least one lower segment and the at least one upper segment have lateral surfaces inclined towards one another.

15. The cover according to claim 13, wherein each strip includes a plurality of lower segments, and a plurality of upper segments, the hinge joint being formed on a common intermediate sheet interposed between the plurality of lower segments and the plurality of upper segments.

16. The cover according to claim 15, wherein the intermediate sheet comprises a skirt projecting laterally relative to the strips.

17. The cover according to claim 11, further comprising:
   the elongate body comprises a plurality of pieces assembled to be longitudinally joined together, each piece of the plurality of pieces defining a longitudinal support ridge for supporting another piece of the plurality of pieces and a longitudinal cooperation ridge for cooperating with the support ridge of another piece of the plurality of pieces, the cover comprising assembling elements for assembling the successive pieces of the plurality of pieces therebetween.

18. An operating assembly disposed to be facing a fluid transporting pipe submerged under a body of water, comprising:
   at least one cover according to claim 1;
   an activation, control and monitoring unit for activating, controlling and monitoring the or each longitudinal interaction element for interacting with the pipe, connected to the or each cover.

19. The assembly according to claim 18, further comprising a rotating storage, the cover being configured to be wound and unwound in a reversible manner over the rotating storage.

20. An interaction method for interacting with a fluid transport pipe disposed in a body of water, including the steps of:
   providing a cover according to claim 1;
   placing the cover in the body of water facing an outer surface of the fluid transport pipe;
   activating the or each longitudinal interaction element, and interacting the or each longitudinal interaction element with the pipe.

21. A method according to claim 20, wherein the step of placing the cover includes applying the cover on to the outer surface of the fluid transport pipe, and spontaneously deforming the cover so as to fittingly adapt to the shape of the outer surface of the fluid transport pipe.

22. The method according to claim 20, wherein the pipe is at least partially buried in the bed of the body of water, the step of placing the cover further comprising applying the cover on to a bearing surface situated at a distance away from and facing the outer surface of the fluid transport pipe.

23. The method according to claim 22, wherein the bearing surface is situated on the bed of the body of water.

24. The method according to claim 20, wherein the step of interacting the or each longitudinal interaction element with the pipe comprises heating the pipe or measuring a temperature of the pipe.

25. The cover according to claim 1, wherein the elongate body has a length that is greater than 1 km.

26. A removable cover intended to be applied to be facing a fluid transport pipe submerged in a body of water, comprising:
   an elongate body, configured to be applied facing an outer surface of the pipe;
   at least one longitudinal interaction element for interacting with the pipe, supported by the elongate body; and
   wherein the elongate body is reversibly deformable under the effect of its own weight, the elongate body having a length greater than 10 m, the elongate body being configured to be wound in a reversible manner over a rotating storage.

* * * * *